United States Patent
Konno et al.

[11] Patent Number: 5,934,879
[45] Date of Patent: Aug. 10, 1999

[54] PUMP TORQUE CONTROL SYSTEM

[75] Inventors: Shigetoshi Konno, Tsuchiura; Toichi Hirata, Ushiku; Genroku Sugiyama, Miko-mura; Shigehiro Yoshinaga, Yokohama; Youichi Kowatari, Dejima-mura; Kouji Ishikawa, Tsuchiura, all of Japan

[73] Assignee: Hitachi Construction Machinery Co., Ltd., Tokyo, Japan

[21] Appl. No.: 08/771,195

[22] Filed: Dec. 20, 1996

[30] Foreign Application Priority Data

Dec. 22, 1995 [JP] Japan ..................................... 7-335100

[51] Int. Cl.$^6$ .................................................... F04B 49/00
[52] U.S. Cl. .......................................... 417/15; 417/222.1
[58] Field of Search .............................. 60/452, 449, 445, 60/430, 448; 417/216, 20, 15, 220, 222.1; 318/432; 91/461; 123/386, 357; 74/664

[56] References Cited

U.S. PATENT DOCUMENTS

| | | | |
|---|---|---|---|
| 4,637,781 | 1/1987 | Akiyama et al. | 417/216 |
| 5,307,631 | 5/1994 | Tatsumi et al. | 60/462 |
| 5,540,554 | 7/1996 | Masuzawa | 417/20 |
| 5,628,188 | 5/1997 | Kordak | 60/449 |
| 5,630,317 | 5/1997 | Takamura | 60/445 |

Primary Examiner—Charles G. Freay
Assistant Examiner—Robert Z. Evora
Attorney, Agent, or Firm—Evenson, McKeown, Edwards & Lenahan, PLLC

[57] ABSTRACT

An engine torque, which corresponds to a target engine speed inputted in a controller, is determined by a functional computing function unit. A torque correction value is added to the engine torque, followed by the multiplication with a constant. The product is divided by a pump delivery pressure to determine a pump displacement. A target tilting corresponding to this value is determined by another functional computing function unit, and is then compared with another target tilting which has been determined from a negative control pressure. The smaller one is selected and is outputted as a target tilting. The torque correction value is set at an EEPROM through an input device as desired. Selection of a negative value as the torque correction value makes it possible to prevent occurrence of stalling.

4 Claims, 4 Drawing Sheets

1

PUMP TORQUE CONTROL SYSTEM

BACKGROUND OF THE INVENTION a) Field of the Invention

This invention relates to a pump torque control system for controlling a variable displacement hydraulic pump upon performing work by an equipment driven by working oil delivered from the variable displacement hydraulic pump.

b) Description of the Related Art

Many of hydraulic work vehicles such as hydraulic shovels carry variable displacement hydraulic pumps (hereinafter simply called "hydraulic pumps") mounted thereon, and drive hydraulic actuators by pressure oil from the hydraulic pumps to perform work as required. A hydraulic circuit usable in such hydraulic work vehicles will be described taking a hydraulic shovel as an example.

FIG. 3 is a hydraulic circuit diagram of the hydraulic shovel. In the diagram, there are shown an engine 1, a throttle lever 1a for designating a target speed (rpm) of the engine 1, and a key switch for commanding a start of the engine 1. The throttle lever 1a is provided with an unillustrated target speed (rpm) generator, which outputs an electrical signal proportional to the target rpm designated through the throttle lever 1a. Also illustrated are a hydraulic pump 2 driven by the engine 1 and a displacement varying means 2a for the hydraulic pump 2, such as a swash plate type means or a bent axis type means (hereinafter represented by the "swash plate type means"). Numeral 3 indicates a regulator for controlling the swash plate type means 2a, which is composed of a hydraulic cylinder 3a for driving the swash plate type means 2a and a horse power control spool 3b and flow rate control spool 3c for controlling drive of the hydraulic cylinder 3a.

Designated at numerals 5 and 6 are a boom cylinder and a flow rate control valve for controlling drive of the boom cylinder 5, respectively. In addition to a hydraulic actuator for the boom cylinder 5, the hydraulic shovel is also provided with hydraulic actuators for an arm cylinder, bucket cylinder, swivelling motor, running motor and the like. Flow control valves are also arranged for these hydraulic actuators. These additional hydraulic actuators and their flow control valves are however omitted in the diagram. Designated at numeral 7 is a center by-pass line, which extends from the hydraulic pump 2 to a tank 8 through the individual flow control valves which are in their neutral positions. Numeral 9 indicates a restrictor arranged in the center by-pass line 7 at a position further downstream of the most downstream flow control valve.

Also shown are a pump delivery pressure sensor 10 for detecting a delivery pressure $P_d$ of the hydraulic pump 2 and a negative control pressure sensor 11 for detecting a pressure (negative control pressure) $P_n$ on an upstream side of the restrictor 9. Designated at numeral 12 is a controller, which is inputted with the target rpm from the throttle lever 1a, the pump delivery pressure $P_d$ detected by the pump delivery pressure sensor 10 and the negative control pressure $P_n$ detected by the negative control pressure sensor so that a predetermined control signal is obtained. Numeral 13 indicates a solenoid-operated proportional valve which operates in response to an output signal from the controller 12.

When any one of the flow control valves, for example, the flow control valve 6 is operated in the above-described construction, a small stroke of the flow control valve leads to a high flow rate through the center by-pass line 7 and a high negative control pressure $P_n$ whereas a large stroke of the flow control valve results in a low negative control pressure $P_n$. When the negative control pressure $P_n$ is high, the controller 12 computes a target tilting of the swash plate type means 2a so that the delivery pressure of the hydraulic pump 2 is decreased. When the negative control pressure $P_n$ is low, on the other hand, the controller 12 computes a target tilting of the swash plate type means 2a so that the delivery pressure of the hydraulic pump 2 is increased. As a result of this computation, a hydraulic horse power is determined, and the controller 12 performs horse power control by computing the target tilting in such a way that the hydraulic horse power will not exceed the horse power of the engine 1. Described specifically, the controller 12 converts the results of the computation into a command value of electric current for driving the solenoid-operated proportional valve 13, an electric current is outputted from an unillustrated power supply in response to the command value, and corresponding to the electric current, the regulator 3 then drives the swash plate type means 2a. As a result, pressure oil sufficient to drive the boom cylinder 5 is delivered from the hydraulic pump 2. The so-delivered pressure oil produces hydraulic horse power.

On the other hand, rotation of the engine 1 produces a torque on a shaft which is connected to the hydraulic pump 2. Engine horse power is determined by the torque produced here and the rpm of the engine 1. Accordingly, the engine 1 must produce engine horse power sufficient to produce the above-mentioned hydraulic horse power observing this from the side of the hydraulic pump 2, the controller 12 must control the target tilting so that no hydraulic horse power greater than the engine horse power be allowed to occur.

FIG. 4 is a diagram for describing functions which relate to the horse power control by the controller 12. The diagram shows a target rpm generator 1a, for outputting a target rpm corresponding to a stroke of the throttle lever 1a when the throttle lever 1a is operated, and also the pump delivery pressure sensor 10 which is depicted in FIG. 3 and outputs a delivery pressure $P_d$ of the hydraulic pump 2. Also illustrated are a functional computing function unit 121 for storing a data map of engine torques T versus target rpms N (base torque) and determining an engine torque corresponding to a given target rpm, a constant setting function unit 122, a multiplying function unit 123, a dividing function unit 124, and another functional computing function unit 125 for storing a data map of displacements q of the hydraulic pump 2 as obtainable at the dividing function unit 124 versus target tiltings $\theta_1$ and determining a displacement corresponding to a given target tilting. There are also depicted a further functional computing function unit 126 for being inputted with a negative control pressure $P_n$ and determining another target tilting $\theta_2$ corresponding to the negative control pressure $P_n$, and a minimum value selecting function unit 127 for selecting the smaller one of the target tilting $\theta_1$ obtained by the functional computing function unit 125 and the target tilting $\theta_2$ obtained by the functional computing function unit 126. Sign $\theta_{13}$ indicates the so-selected target tilting which is outputted to the solenoid-operated proportional valve 13.

When a target rpm N is inputted, a corresponding engine torque T is determined by the functional computing function unit 121. At the multiplying function unit 123, the thus-determined engine torque T is multiplied by a constant which has been preset at the constant setting function unit 122. At the dividing function unit 124, the results of the computation are divided by an inputted pump delivery pressure $P_d$ so that a displacement q is obtained. A target tilting $\theta_1$ of the swash plate type means 2a, which corresponds to the displacement q, is determined at the functional computing function unit 125. At the minimum value selecting function unit 127, this target tilting $\theta_1$ is compared with another target tilting $\theta_2$ which has been obtained by the functional computing function unit 126. The smaller one is then outputted as a final target tilting $\theta_{13}$ to the solenoid-operated proportional valve 13, thereby making it possible to perform control (horse power control) so that hydraulic horse power will not exceed the engine horse power.

The functions until the displacement q is obtained can be expressed by equations as will be described next.

Assuming now that the mechanical efficiency and volumetric efficiency of the hydraulic pump 2 are $\eta_m$ and $\eta_v$, respectively, the overall efficiency $\eta_p$ of the hydraulic pump 2 is expressed by:

$$\eta_p = \eta_m \times \eta_v \quad (1)$$

Here, assuming that engine horse power and hydraulic horse power are $L_E$ and $L_p$, respectively, the following equation can be derived:

$$L_p = \eta_p \times L_E \quad (2)$$

Further, representing a flow rate of the hydraulic pump 2 by Q, an engine torque by T as described above, and a delivery pressure of the hydraulic pump 2 by $P_d$ as described above, $L_E$ and $L_p$ can be defined as follows:

$$L_E = N \times T / 716 \quad (3)$$

$$L_p = P_d \times Q / 450 \quad (4)$$

From the equations (2), (3) and (4), the following equation can be derived:

$$T = P_d \times Q / (0.628 \times \eta_p \times N) \quad (5)$$

Assuming that the displacement of the hydraulic pump 2 is q as described above, the flow rate Q in the equation (5) can be defined as follow:

$$Q = \eta_v \times N \times q / 1000 \quad (6)$$

Introduction of the equation (6) into the equation (5) makes it possible to determine the displacement q by the following equation:

$$q = 628 \times \eta_m \times T / P_d \quad (7)$$

In the equation (7), the engine torque T is the value obtained by the functional computing function unit 121 while the coefficient ($628 \times \eta_{nm}$) is the value preset at the constant setting function unit 122.

When the controller 12 is composed of a computer, the functional computing function unit 121 stores a data map of engine torques T versus target rpms N at a predetermined area of a memory and extracts an engine torque (base torque) T corresponding a given target rpm N, the functional computing function unit 125 stores a data map of displacements q versus target tiltings $\eta_1$ at another predetermined area of the memory and extracts a target tilting $\eta_1$ corresponding to a given displacement $\eta_1$ and likewise, the functional computing function unit 126 stores a data map of negative control pressures $P_n$ versus target tiltings $\eta_2$ at a further predetermined area of the memory and extracts a target tilting $\eta_2$ corresponding to a given negative control pressure $P_n$. Further, the constant setting function unit 122 stores a constant at a predetermined area of the memory other than the above-mentioned areas. On the other hand, the multiplying function unit 123, dividing function unit 124 and minimum value selecting function unit 127 are computing function units which are generally included in a computer.

Appropriate horse power control is performed by the controller 12 as described above. However, if the engine has been used over an extended period of time or fuel for the engine is not of good quality, the above-described horse power control may often cause stalling during work. In such a case, the work cannot be performed smoothly. If a new engine is used, an engine torque greater than a predetermined engine torque may conversely be produced. In this case, the above-described horse power control may cause a situation where the useful large engine torque cannot be effectively used.

SUMMARY OF THE INVENTION

An object of the present invention is therefore to overcome the above-described problems of the conventional art, and to provide a pump torque control system which makes it possible to avoid occurrence of stalling and also to fully use engine torque.

To achieve the above-described object, the present invention provides a pump torque control system provided with a variable displacement hydraulic pump driven by an engine, a displacement varying means for determining a delivery rate of the variable displacement hydraulic pump, a regulator for controlling a tilting of the displacement varying means, pump delivery pressure detection means for detecting a delivery pressure of the variable displacement hydraulic pump, an engine speed designating means for designating a target speed of the engine, and control means for determining a torque of the engine corresponding to the target engine speed designated by the engine speed designating means and then controlling the regulator on the basis of the torque so determined. The pump torque control system comprises correction means for correcting the so-determined torque of the engine by a value preset at setting means.

According to the present invention, a torque (base torque) of the engine determined as described above is corrected by a torque correction value. If there is a potential problem of stalling, the torque correction value is set as a negative value to permit prevention of occurrence of stalling. If an engine torque is high conversely, the torque correction value is set as a positive value to allow full utilization of the engine torque.

DETAILED DESCRIPTION OF THE INVENTION AND PREFERRED EMBODIMENT

The present invention will hereinafter be described based on the embodiment illustrated in FIGS. 1 and 2.

Figure 1:
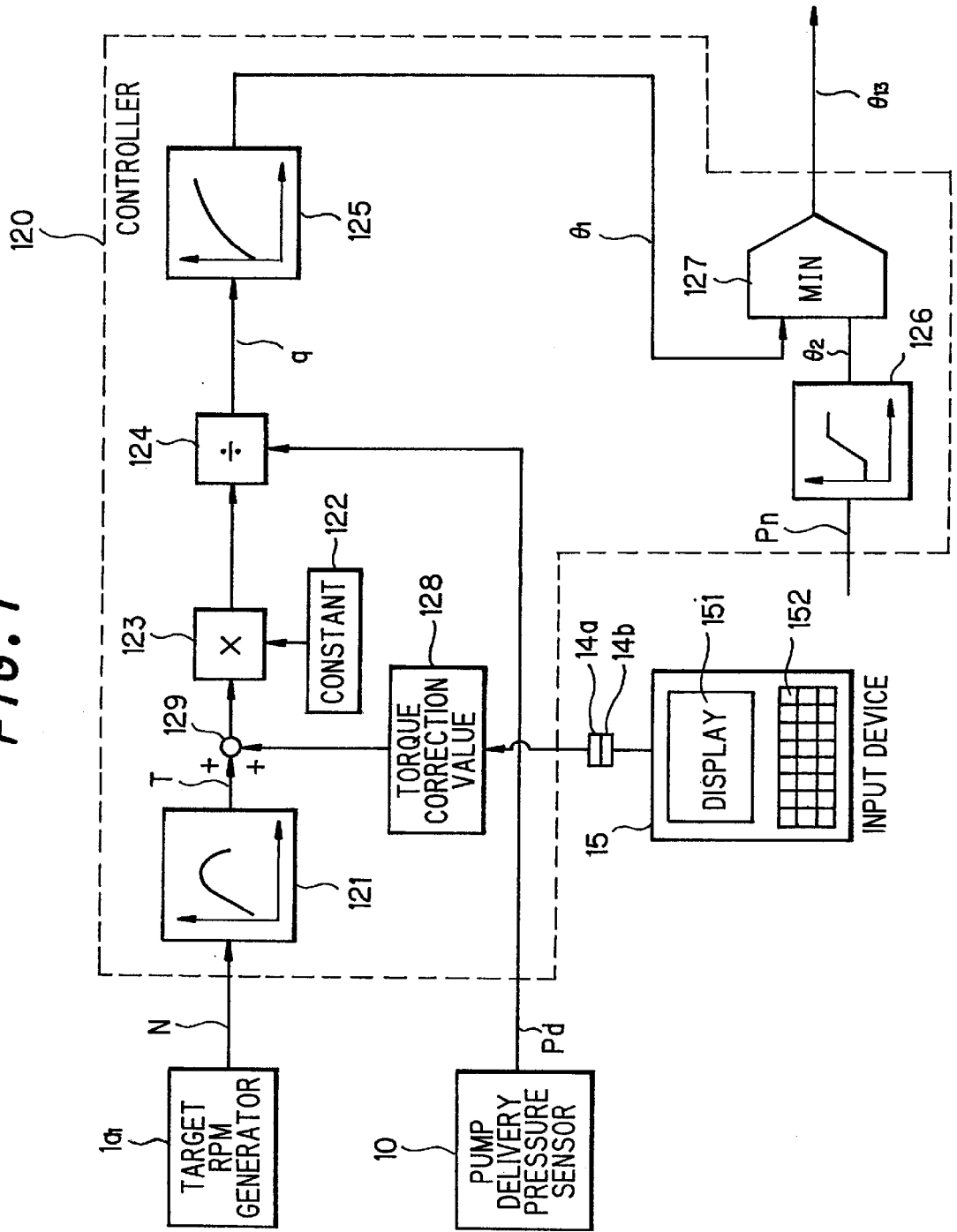
FIG. 1 is a circuit diagram illustrating functions relating to horse power control by a controller according to one embodiment of the present invention.
Figure 4:
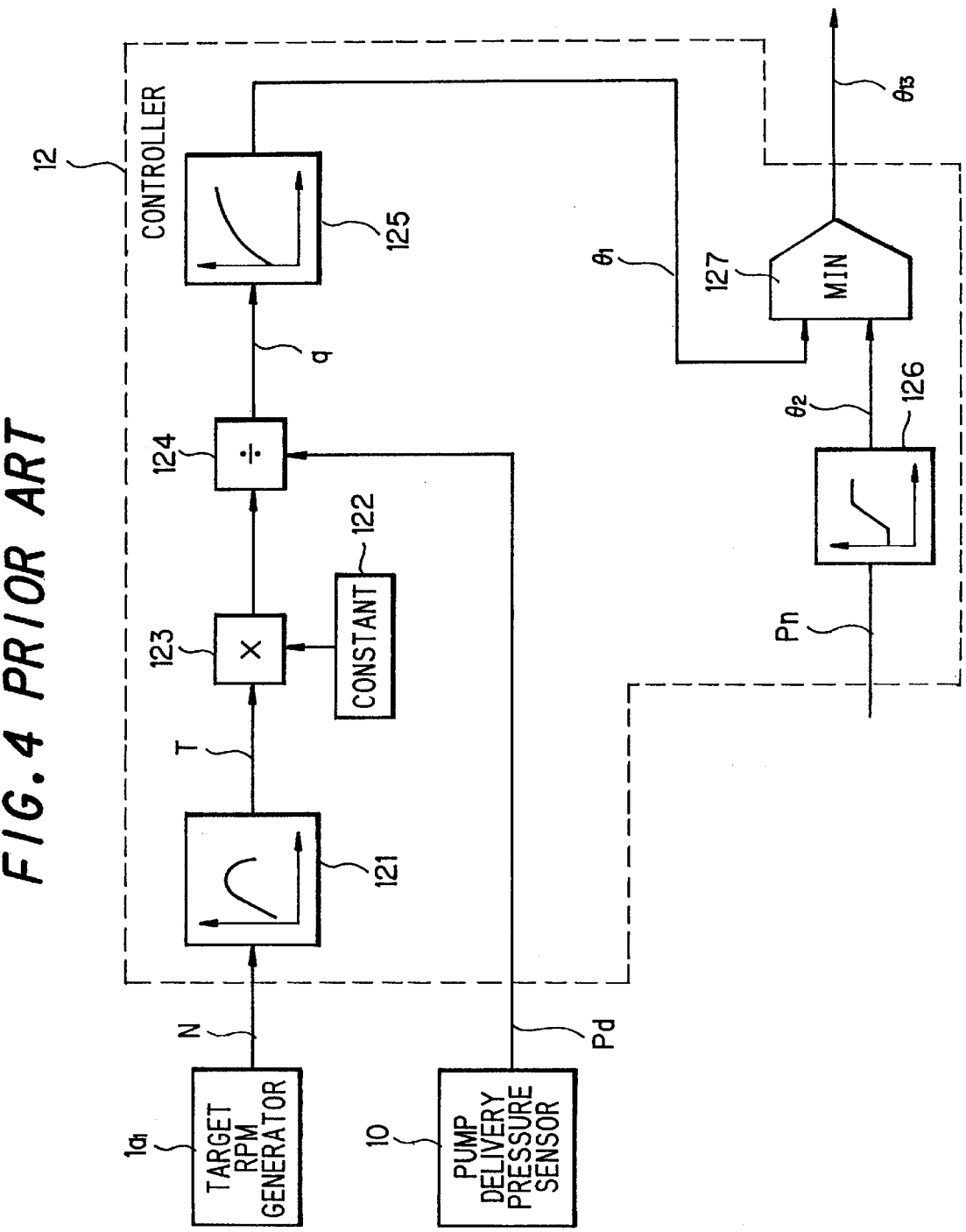
FIG. 4 is block diagram illustrating functions relating to horse power control by a controller shown in FIG. 3.

In FIG. 1, elements either identical or equivalent to the corresponding elements shown in FIG. 4 are identified by like signs and their description is omitted herein. Numeral 120 indicates the controller according to the embodiment of the present invention. Designated at numeral 128 is a torque correction value setting function unit at which a value is set for the correction of a torque T obtained by a functional computing function unit 121. Numeral 129 indicates an adding function unit for adding the torque T obtained by the functional computing function unit 121 and the torque correction value preset at the torque correction value setting function unit 128. When the controller is composed of a computer, the torque correction value setting function unit 128 functions to store a torque correction value. To perform this function, an EEPROM (electrically erasable and programmable read only memory) is used. Further, the adding function unit 129 is a computing function unit which is generally included in a computer. Designated at numeral 15 is a portable input/device composed of a computer. The input device is connected to the EEPROM by connecting together a connector 14a on a side of the EEPROM and a connector 14b on a side of the input device. Numeral 151 designates a display of the input device 15 while numeral 152 indicates a keyboard.

Next, operation of the present embodiment will be described. In general, a maintenance serviceman periodically visits a work vehicle or is sent to it in response to a user's request, and conducts maintenance and inspection work as needed. Incidentally, an engine may stall or may become about to stall during work. This is judged to have occurred as a result of the existence of a substantial difference between a base torque stored by the functional computing function unit 121 and a torque actually producible by the engine 1 due to a torque reduction of the engine 1.

Accordingly, if there is a complaint from the user to the effect that "the engine stalls or becomes about to stall" or such a problem is discovered during maintenance and inspection work, the maintenance serviceman connects the portable input device 15 to the EEPROM through the connectors 14a, 14b, and inputs a predetermined value in the EEPROM so that the predetermined value is stored as a torque correction value. This torque correction value should be set at such a value that is not considered to cause stalling in view of conditions of the engine 1 during operation of the work vehicle and in the light of the experiences of the maintenance serviceman. When coping with stalling in this manner, the torque correction value is set at a negative value. Conversely, a positive value is set when the engine 1 is new and is considered to be able to produce greater torque.

Figure 2:
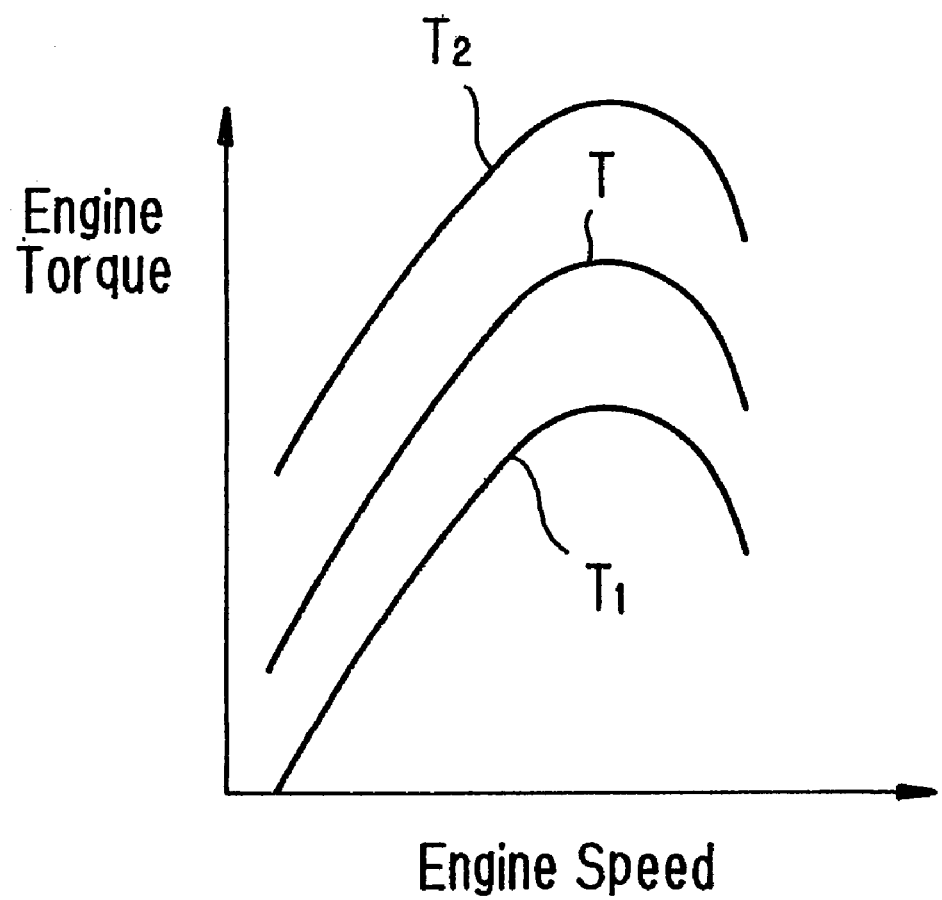
FIG. 2 diagrammatically shows the results of an addition by the adding function illustrated in FIG. 1.
Figure 3:
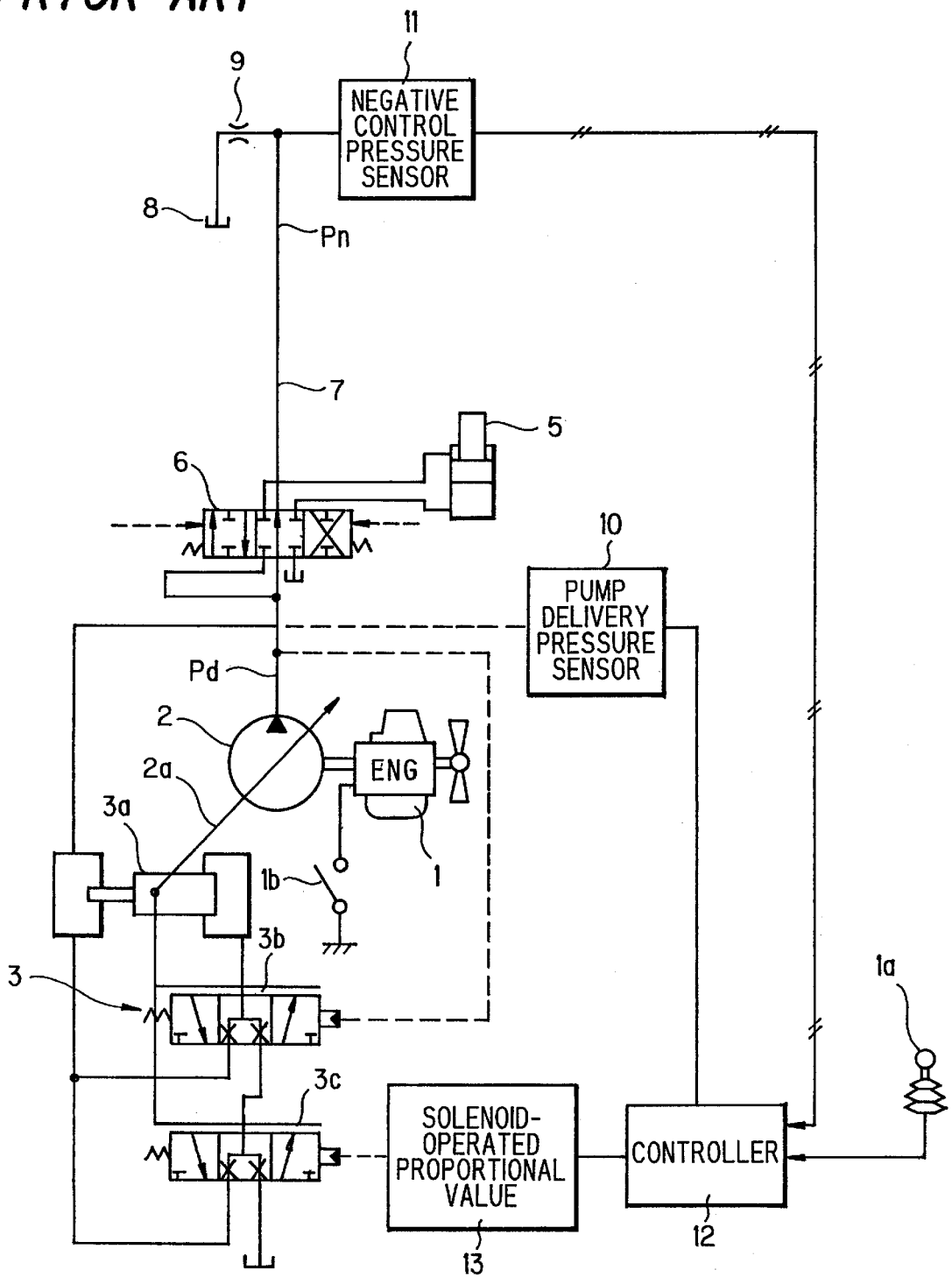
FIG. 3 is a hydraulic circuit diagram of a hydraulic shovel.

FIG. 2 illustrates the results of an addition by the adding function unit 129 shown in FIG. 1. In this diagram, T designates an engine torque (base torque) characteristic curve which is stored at the functional computing function unit 121. In FIG. 1, an engine torque T obtained by the functional computing function unit 121 is added to a torque correction value set at the EEPROM by the adding function unit 129. Now assume that the torque correction value set at the EEPROM is a negative value to cope with stalling. The outputted engine torque T is subtracted by the torque correction value at the adding function unit 129. As a result, engine torques at respective target rpms, said engine torques being obtainable by the functional computing function unit 121, are decreased by a similar extent relative to the base torque characteristic curve T as indicated by a curve $T_1$ in FIG. 2. As a consequence, the target tilting $\theta_1$ is also decreased so that stalling of the engine 1 can be avoided. When a positive torque correction value is conversely set to cope with a situation that the engine 1 is new and is considered to be able to produce greater torque, the outputted engine torque T is added by the torque correction value at the adding function unit 129 so that engine torques at respective target rpms, said engine torques being obtainable by the functional computing function unit 121, are increased by a similar extent relative to the base torque characteristic curve T as indicated by a curve $T_2$ in FIG. 2. As a consequence, the target tilting $\theta_1$ is also increased so that engine torque can be fully used.

Incidentally, it is to be noted that in FIG. 2, the torque correction values, namely, the distance between the curve T and the curve $T_1$ and that between the curve T and the curve $T_2$ are shown with an exaggeration to facilitate understanding.

Since the present embodiment is designed to correct a base torque by a torque correction value in accordance with a state of the engine as described above, occurrence of stalling can be avoided by setting the torque correction value at a negative value when there is a potential problem of stalling. Where an engine torque is high in contrast, the high engine torque can be fully used by setting the torque correction value at a positive value. Further, the use of the EEPROM for the setting of the torque correction value has made it possible to successively change the torque correction value to appropriate values as functions of the engine drop, thereby permitting effective avoidance of occurrence of stalling while using the functions of the engine to maximum extents.

The present embodiment has been described using the hydraulic shovel as an illustrative work vehicle. It is however clear that the present invention can also be applied to other work vehicles. Further, the description has been made of the embodiment where the controller was composed of the computer. The controller can obviously be constructed by an analog circuit. In this case, setting means which permits setting of desired torque correction values can be used in place of the EEPROM. Further, it is not absolutely necessary to change the torque correction values. In such a case, a fixed memory or setting means is used for the setting of the torque correction values.

What is claimed is:

1. A pump torque control system provided with a variable displacement hydraulic pump driven by an engine, the system comprising:

a displacement varying means for determining a delivery rate of said variable displacement hydraulic pump;

a regulator for controlling a tilting of said displacement varying means;

a pump delivery pressure detection means for detecting a delivery pressure of said variable displacement hydraulic pump;

an engine speed designating means for designating a target speed of said engine;

a functional computing function unit with a stored data map of torques of said engine versus target engine speeds;

a control means for controlling said regulator on the basis of a torque determined by said functional computing function unit; and a correction means for correcting the torque of said engine, which has been determined by said functional computing function unit, by a preset value.

2. A pump torque control system according to claim 1, wherein said correction means comprises means for adding or subtracting said preset value to or from the so-determined torque of said engine.

3. A pump torque control system according to claim 1, wherein said preset value is changeable.

4. A pump torque control system according to claim 3, wherein said preset value is set by an EEPROM.

* * * * *